United States Patent [19]

Sakurai et al.

[11] Patent Number: 5,787,762
[45] Date of Patent: Aug. 4, 1998

[54] METHOD OF ATTACHING PAD MODULE ON STEERING WHEEL

[75] Inventors: Koji Sakurai, Inazawa; Katsunobu Sakane, Ichinomiya; Yuji Kuriyama, Seki, all of Japan

[73] Assignee: Toyoda Gosei Co., Ltd., Aichi-ken, Japan

[21] Appl. No.: 585,467

[22] Filed: Jan. 16, 1996

[30] Foreign Application Priority Data

Jan. 17, 1995 [JP] Japan .................................. 7-005022

[51] Int. Cl.[6] .................................................. B62D 1/04
[52] U.S. Cl. ................................................ 74/552; 29/894.1
[58] Field of Search ........................ 74/882; 280/728.2, 280/731; 264/259; 29/894.1

[56] References Cited

U.S. PATENT DOCUMENTS

| | | | |
|---|---|---|---|
| 5,222,415 | 6/1993 | Fujita et al. | 74/552 |
| 5,228,362 | 7/1993 | Chen et al. | 74/552 |
| 5,267,486 | 12/1993 | Niwa et al. | 74/552 |
| 5,553,888 | 9/1996 | Turner et al. | 74/552 X |
| 5,590,900 | 1/1997 | Duran et al. | 280/728.2 |
| 5,593,178 | 1/1997 | Shiga et al. | 280/731 |

*Primary Examiner*—Rodney H. Bonck
*Assistant Examiner*—Saúl J. Rodriguez
*Attorney, Agent, or Firm*—Cushman Darby & Cushman IP Group of Pillsbury Madison & Sutro, LLP

[57] ABSTRACT

A pad module is attached to a steering wheel according to the attaching method of the invention in the following manner. First, a lower cover is formed to have a bolt hole and a temporary bolt holder. The bolt holder is integral with the lower cover via a hinge portion and an arm portion. The arm portion is turned around the hinge portion to position the bolt holder in registration with the bolt hole, and is fixedly held. Then, the lower cover is secured to the steering wheel main body, and a bolt is inserted through the temporary bolt holder from the bolt hole and temporarily held by the holder. Thereafter, the pad module is set in place, and a nut is engaged with the bolt. By fastening the bolt with a fastening jig, the pad module is attached to the steering wheel main body. Because the temporary bolt holder is provided integrally with the lower cover, separate parts for temporarily holding a bolt is unnecessary and accordingly, it is not required to fix such parts by screw fasteners or the like. The number of parts and time required for attachment of the pad module decreases to attain cost reduction and improvement of work efficiency.

10 Claims, 10 Drawing Sheets

METHOD OF ATTACHING PAD MODULE ON STEERING WHEEL

BACKGROUND OF THE INVENTION

1. Field of the Invention

The present invention relates to a method for attaching a steering wheel pad mod to the main body of a steering wheel.

2. Description of the Prior Art

Conventionally, a steering wheel pad module, equipped with an air bag device, includes a metal plate bag holder, and a pad body of a resin material secured to the bag holder by rivets. The bag holder is fixed to a steering wheel main body by bolts.

More specifically, as shown in FIG. 13, a pair of metal plates 53, used to attach the module, are fixed to spoke portions 52 of a steering wheel main body 51 with rivets 54. FIG. 14 shows one of the attachments as including, a temporary bolt holder 55 that is secured to an intermediate portion of each metal plate 53 by screw 56. The temporary bolt holder 55 is made of resin and has a substantially cylindrical shape and through hole 57 integrally formed at a portion thereof together with a projection 58 which acts as an interim detent or stop. A bolt 59, having a specific shape, will have been previously inserted into and is temporarily held by the temporary bolt holder 55 prior to attachment thereof. Bolt 59 has a groove 61 formed at a top end thereof and is temporarily held in position by projection 58 which engages groove 61.

As shown in FIG. 15, when attaching the pad module 62, a bag holder bracket 63 is located at a predetermined position whereby, a bolt hole 64 of the bag holder 63 becomes registered with through hole 57 of the temporary bolt holder 55. Further, a nut 65 is positioned on an inner side of the bag holder 63, so that the bolt 59 and the nut 65 can be tightly fastened together by means of fastening jigs (not shown). Through this fastening operation, the pad module 62 is attached to the steering wheel main body 51.

However, in the above-described approach, it is still necessary to separately secure the temporary bolt holder 55 to plate 53 by the screw fasteners 56 when attaching the pad module 62 to the steering wheel main body 51. Accordingly, the number of required parts is increased by the temporary bolt holder 55 and the screw fasteners 56, resulting in reduction of work efficiency.

SUMMARY OF THE INVENTION

The present invention is intended to solve such problems. An object of the invention is to provide a method of attaching a pad module on a steering wheel which reduces the number of parts as well as the required attachment time to thereby reduce manufacture costs and improve work efficiency.

To achieve the above objects, the present invention is directed to a method of attaching a steering wheel pad module to a steering wheel main body by means of at least one bolt such a pad module comprises at least a metal support plate and a pad body secured to that support plate so as to cover the upper portion thereof, which bolt is temporarily held by a temporary bolt holder of a substantially cylindrical shape. A lower cover molded from a resin has the bottom and side walls. A bolt hole is provided for insertion of bolt in the lower cover. A temporary bolt holder is integrally molded with the lower cover with at least one hinge portion connecting the holder to the lower cover. The bolt holder includes at least one arm portion which extends parallel with the bottom. The arm portion can be rotated around the hinge portion to position the temporary bolt holder in registry with the lower cover bolt hole, and a snap-fit mechanism is provided to hold the arm portion and the temporary bolt holder in their registered positions by means of a stopper provided on at least one of the arm portion, the temporary bolt holder and the lower cover. A bolt can be mounted in the temporary bolt holder in preparation for fitting the lower cover to the steering wheel main body and attaching the steering wheel pad module to the steering wheel main body by fastening the temporarily held bolt with a nut provided on the steering wheel main body.

The step of setting the bolt through the temporary bolt holder to temporarily hold it may change its order with the step of fitting the lower cover to the steering wheel main body.

The bolt is extended through a spoke portion made of metal which constitutes a part of the steering wheel main body and then the bolt is fastened.

Further, a positioning mechanism is provided on at least one of the periphery of the bolt hole of the lower cover and the temporary bolt holder so as to facilitate the registration of the temporary bolt holder.

According to the invention the lower cover is molded with a bottom and side walls formed of resin. During molding, a bolt hole for insertion of the bolt is formed in the lower cover, and a bolt holder, having a substantially cylindrical shape, is formed integrally with the lower cover and is connected thereto through the hinge portion. As molded the arm portion extends generally parallel with the bottom. Further, at the time of forming the lower cover, a stopper is provided on at least one of the arm portion, the temporary bolt holder and the lower cover.

After that, the arm portion is rotated around the hinge portion to position the temporary bolt holder in place adjacent the bolt hole, and the arm portion and the temporary bolt holder are held in such a registration position by the stopper.

Further, the bolt is set through the temporary bolt holder and is thereby temporarily held in a ready position. The lower cover is thereafter, fitted to the steering wheel main body.

The pad module comprises at least a metal support plate and a pad body secured to the support plate so as to cover the upper portion of the support plate. The pad module is attached to the steering wheel main body and fastened inplace using the bolt that has been held in a ready position.

As described above, because the temporary bolt holder is formed integrally with the lower cover, in contrast with the prior art which additionally requires separate parts for provisionally holding the bolt, it is unnecessary to use separate parts and also, fixing them by screws or the like is not required.

Because the arm portion extending from the hinge portion is formed to be generally parallel with the bottom at the time of molding the lower cover, the structure of the dies for molding the lower cover is simplified.

During fastening, the bolt is extended through the metal spoke portion which constitutes a part of the steering wheel main body and then fastened. Thus, without requiring a separate metal plate to be fixed to the steering wheel main body, the pad module is directly attached to the steering wheel main body.

Further, because the positioning mechanism is provided on at least one of the periphery of the bolt hole of the lower cover and the temporary bolt holder, it is possible to easily position the temporary bolt holder in place simply by rotation of the arm portion.

As fully described above, according to the method of attaching a steering wheel pad module of the invention, the number of parts can be minimized and certain work previously required for the attachment may be omitted, thereby leading to the excellent result of achieving remarkable cost reductions and improvements in work efficiency. Further, it is possible to prevent the die apparatus for forming the lower cover from being complicated.

Particularly, it is possible to easily position the temporary bolt holder in place, thereby facilitating the attaching operation.

Other objects, features, and characteristics of the present invention will become apparent upon consideration of the following description in the appended claims with reference to the accompanying drawings, all of which form a part of the specification, and wherein referenced numerals designate corresponding parts in the various figures.

DESCRIPTION OF PREFERRED EMBODIMENTS

A first embodiment of the present invention is described hereinafter with reference to FIGS. 1 to 9.

Figure 2:
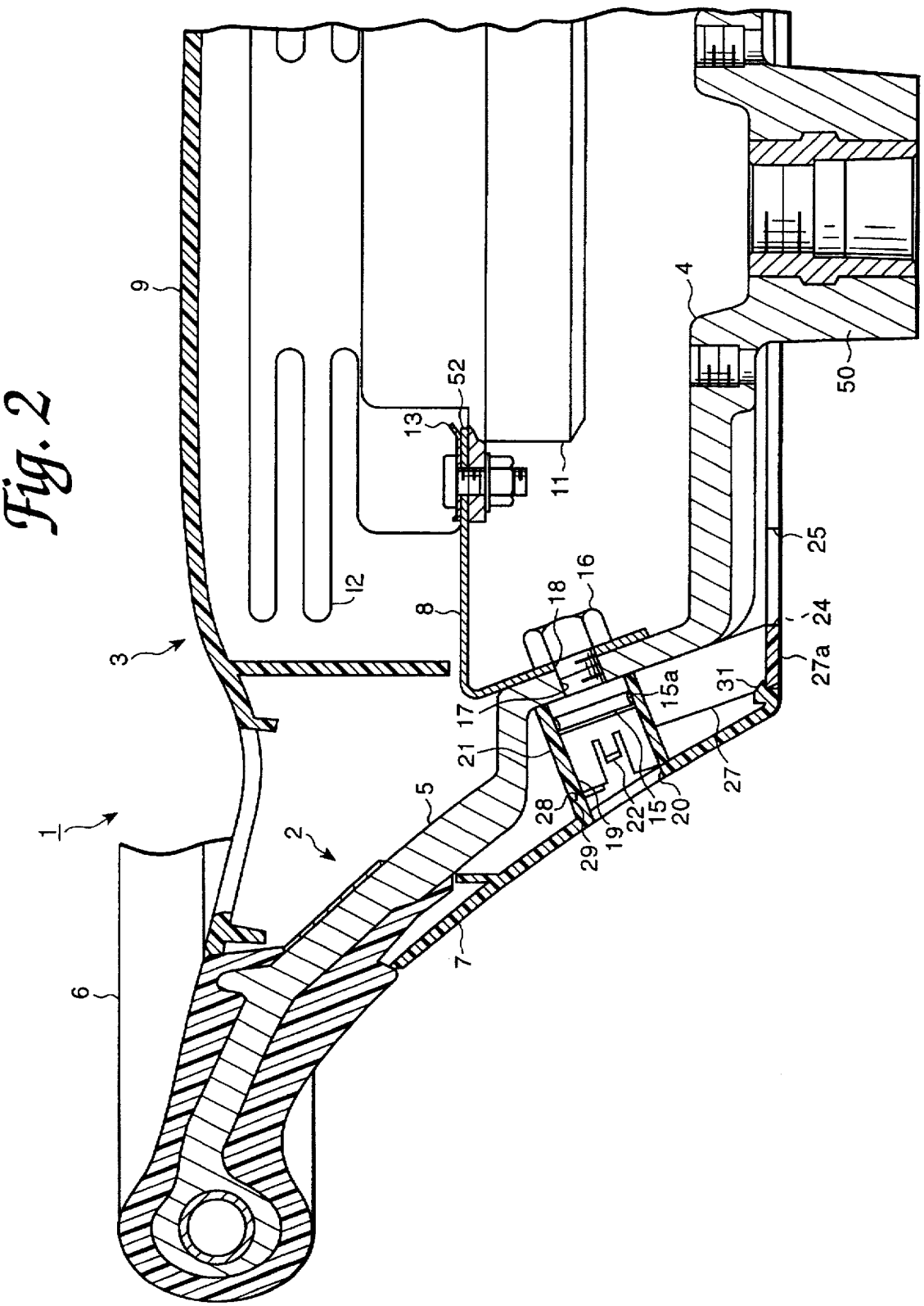
FIG. 2 is a fragmentary section view of a steering wheel according to the embodiment of FIG. 1.

A steering wheel 1 is shown in FIG. 2 comprising a steering wheel main body 2 and a pad module 3 for the steering wheel. The steering wheel main body 2 has a boss portion 4 disposed at a top end of a steering shaft 50, a plurality of spoke portions 5 (three in the illustrated embodiment) each of which extends radially from the boss portion 4. Also included is an annular ring portion 6 fixed to distal ends of the respective spoke portions 5. The steering wheel main body 2 further includes a lower cover 7 made of resin, such as, for example, polypropylene, which is attached to the steering wheel main body 2 so as to cover the lower portions of boss portion 4 and other parts of the structure.

The pad module 3 includes a bag holder 8 in the form of a metal plate and a pad body 9 attached to bag holder 8. More specifically, an inflator 11, which contains a gas producing agent such as sodium azide, is provided in an opening 8a formed at the center of bag holder 8. An air bag 12 made of fabric and a ring plate 13 are fixed at a peripheral edge of opening 52. The pad body 9, preferably made of resin, is attached to the bag holder 8 by rivets (not shown) so as to cover an air bag 12. A horn switch mechanism (not shown) can also be provided on an inner surface of the pad body 9 in order to actuate the horn when at least a portion of the pad body 9 is pressed inwardly.

In the illustrated embodiment, the pad module 3 is tightly fastened to the steering wheel main body 2 by means of bolts 15 and nuts 16. More specifically, the spoke portions 5 and the bag holder 8 are formed with bolt holes 17, 18 within their side walls, respectively. A shank of each bolt 15 having a male screw thread is inserted into the corresponding bolt holes 17, 18 from the outer side or from the side of the lower cover 7 toward the inner side or the side of the bag holder 8 while the bolt holes 17, 18 are being registered with each other. The nuts 16, each having female threads, are screwedly engaged with the respective bolts 15 from the inner side or the side of the bag holder 8 using a fastening jig (not shown).

Prior to this mounting operation, each bolt 15 will have been provisionally held by the lower cover 7 so that a portion of the bolt extends through bolt hole 17 within each spoke portion 5. More specifically, the lower cover 7 is integrally molded with a plurality of temporary bolt holders 21 each of which has a substantially cylindrical shape and a through hole 19. Each temporary bolt holder 21 is also integrally formed with projections 22 which serve as interim detents or stops which hold bolts 15 by having projections 22 engaged with a groove 15a formed at a top end of each bolt 15.

The method of attaching the pad module 3 to the steering wheel main body 2, according to the embodiment of the invention is as follows.

Figure 3:
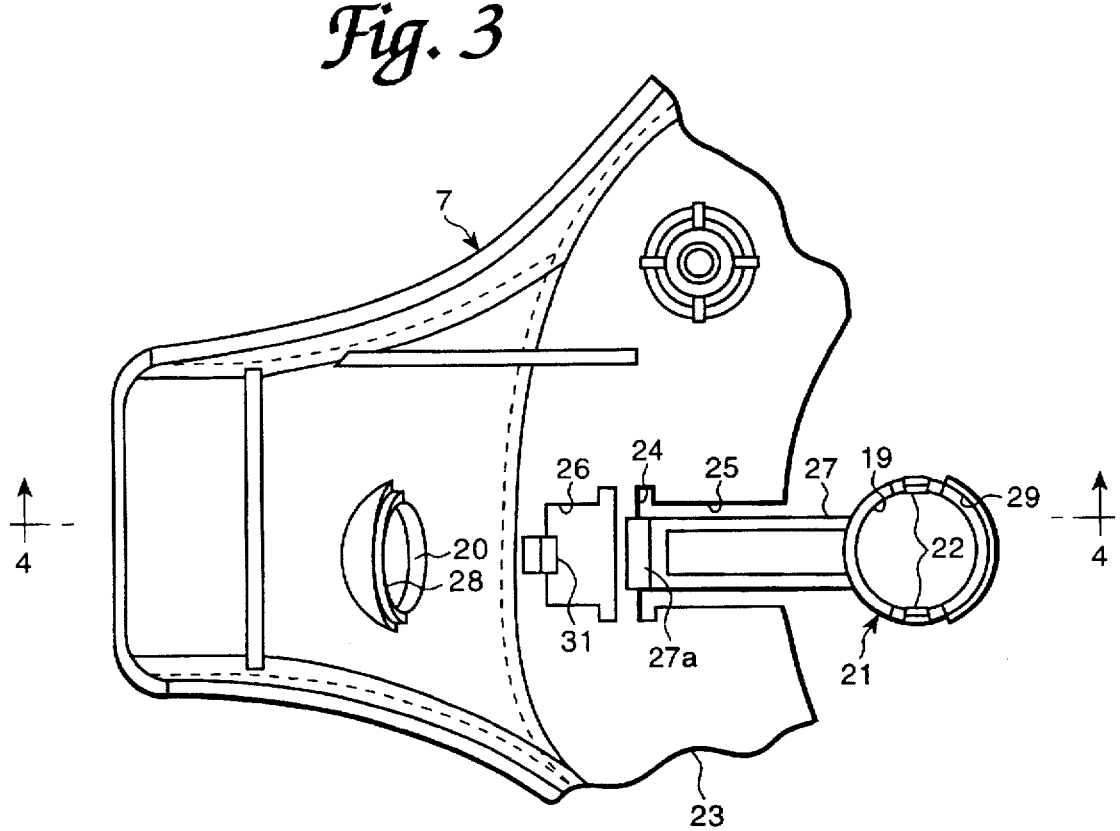
FIG. 3 is a plan view of a portion of the lower cover of the steering wheel in FIG. 1 immediately after molding.
Figure 4:
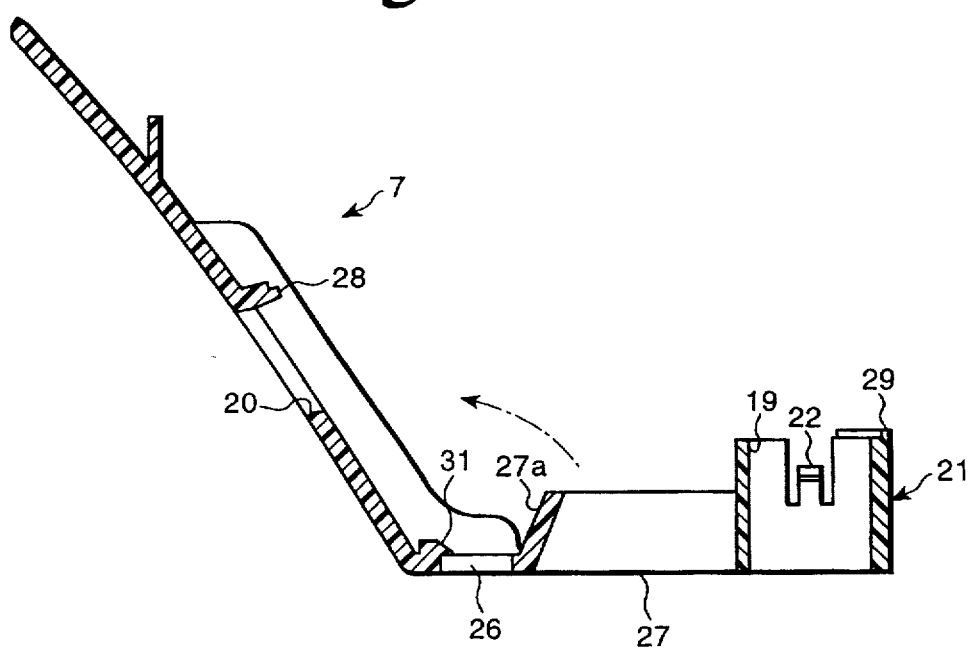
FIG. 4 is a sectional view along line 4—4 of FIG. 3.

As shown in FIGS. 2, 3 and 4, the lower cover 7 has bolt holes 20 and the temporary bolt holders 21 at predetermined positions corresponding to the locations of bolt holes 17. Lower cover 7 is formed by known die molding technique. To simplify the molding apparatus and facilitate the molding operation of lower cover 7 and bolt holder 21, the temporary bolt holders 21 are formed such that their through holes 19, as in FIGS. 3 and 4, extend in directions substantially perpendicular to a bottom 23 of the lower cover 7, respectively. Further, for each temporary bolt holder 21, the bottom 23 of the lower cover 7 is formed with two opening portions 25, 26, as in FIGS. 3, 4 and 6, with a shaft-like hinge portion 24 left therebetween as a boundary. The hinge portion 24 continuously extends from the bottom 23, spanning across the openings 25, 26, and can be torsional without being separated from the bottom 23. Furthermore, as in FIG. 3 and 4 an arm portion 27, formed integrally with the hinge portion 24, extends parallel with bottom 23. The temporary bolt holder 21 is formed integrally with a distal end of the arm portion 27.

A circular extension 28 is provided around a part of the upper peripheral edge of each bolt hole 20. A corresponding stepped portion 29, engageable with extension 28, is formed at the top end, as in FIG. 4, of the corresponding bolt holder 21. The engaging extension 28 and stepped portion 29 together constitute a positioning mechanism, so that it is easy to rotate bolt holder 21 and arm position 27 about hinge 24 and thus into the position shown in FIG. 6 when the temporary bolt holder 21 is positional in place at a respective bolt hole 20.

An engagement claw or catch 31, serving as a holder mechanism, is formed integrally with a part of a periphery of each opening portion 26 opposite hinge 24 and the other opening portion 25 in which the arm portion 27 and the temporary bolt holder 21 lie.

Figure 5:
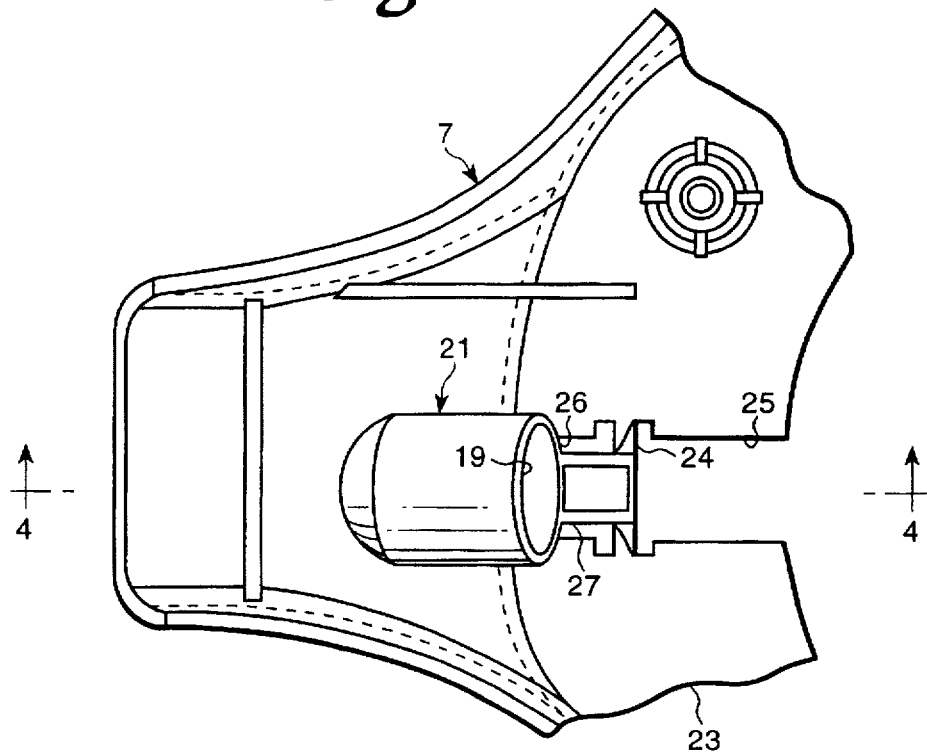
FIG. 5 is a plan view of a portion of the lower cover with the temporary bolt holder positioned in place adjacent a bolt hole.
Figure 6:
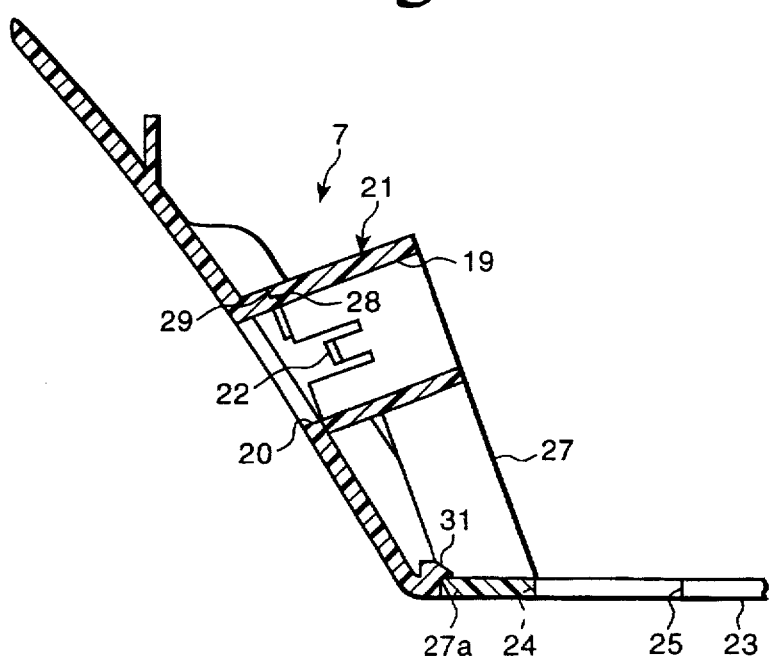
FIG. 6 is a sectional view along line 6—6 of FIG. 5.

As shown in FIGS. 5 and 6, each arm portion 27 is bent or turned toward the side wall of the lower cover 7 around the associated hinge portion 24, so as to position each temporary bolt holder 21 in place at the corresponding bolt hole 20. At this time, the stepped portion 29 at the top end of the temporary bolt holder 21 is smoothly guided by and securely engaged with the circular extension 28 at the periphery of the bolt hole 20, thereby easily and surely obtaining a mutual registration thereof. At almost the same time when the stepped portion 29 engages the circular extension 28, the engagement claw 31 catches on a lower part 27a of the arm portion 27, so that the bolt holder 21 and the arm portion 27 are fixedly held in their turned or rotated state. As a result, the through hole 19 of the temporary bolt holder 21 extends obliquely upwardly.

Figure 7:
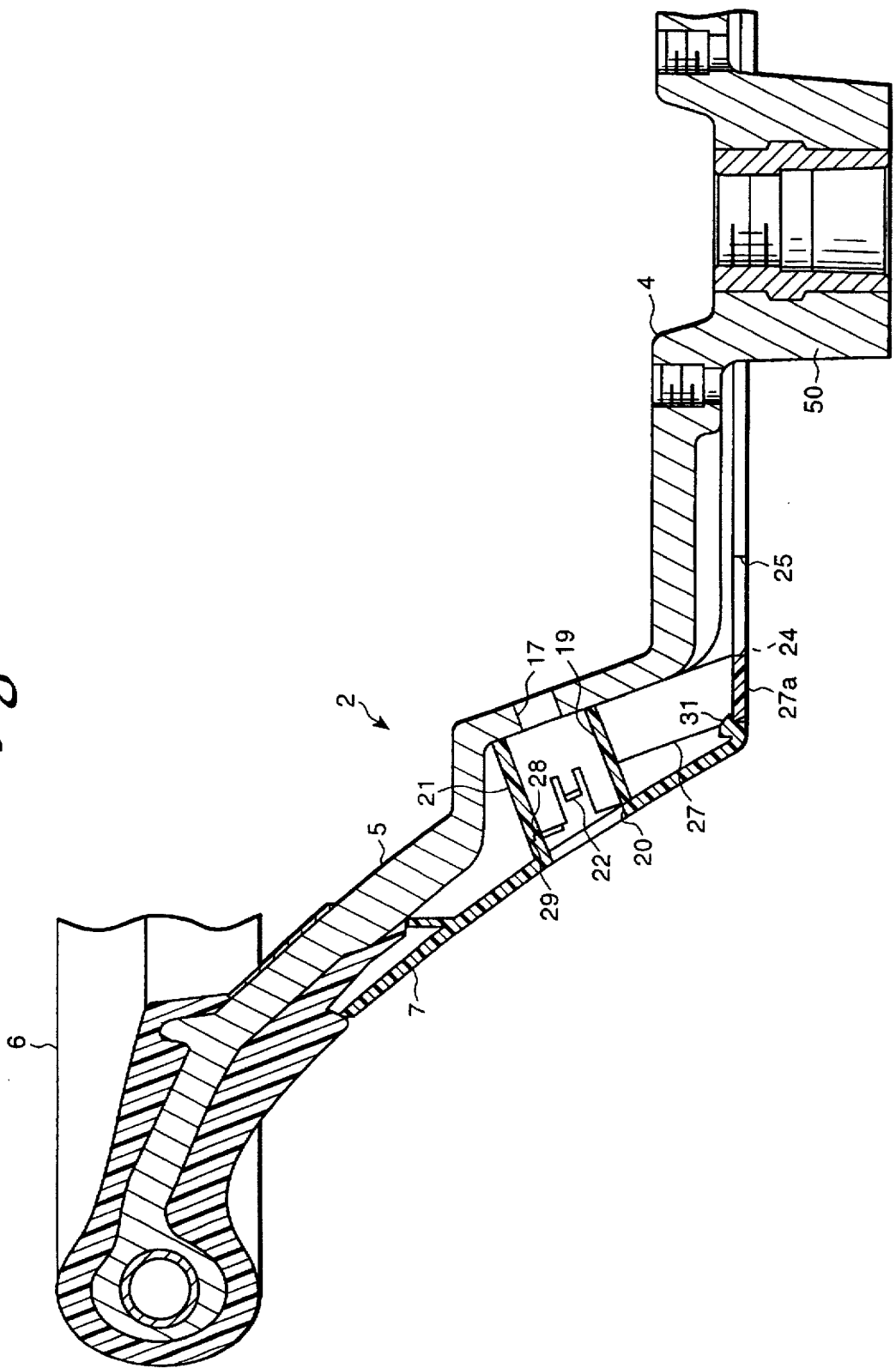
FIG. 7 is a sectional view showing the lower cover secured to a steering wheel main body.

As shown in FIG. 7, the lower cover 7 is secured to the steering wheel main body 2 so that bolt holes 20 one registered with through holes 19 of the temporary bolt holders 21, as described above. The lower cover 7 may be provided with engagement portions for securing it to the spoke portions 5, for example snap-fit mechanisms. Alternatively the lower cover 7 may be secured by separately prepared fastening means such as screws. At this time, however, the lower cover 7 has to be secured so as to cause the bolt holes 17 of the spoke portions 5 and the through holes 19 to communicate with one another.

Figure 8:
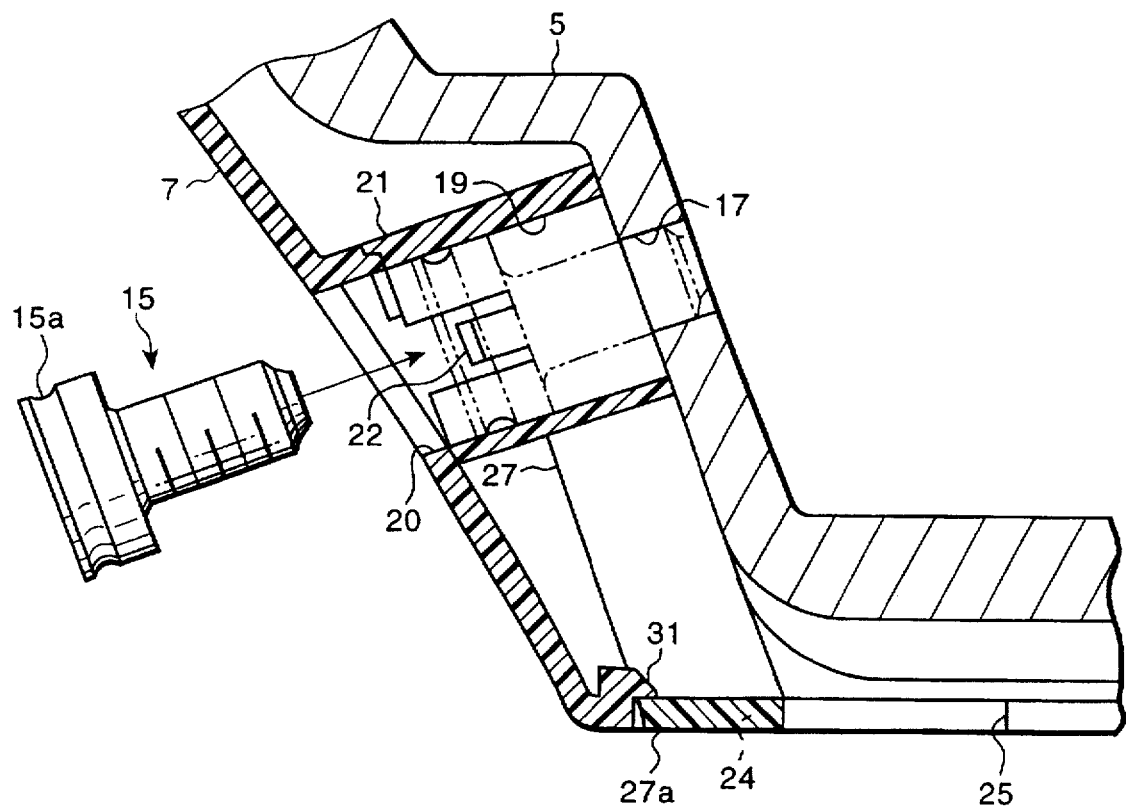
FIG. 8 is a partial exploded and sectional view showing a bolt and the temporary bolt holder with an inserted bolt shown in phantom.
Figure 9:
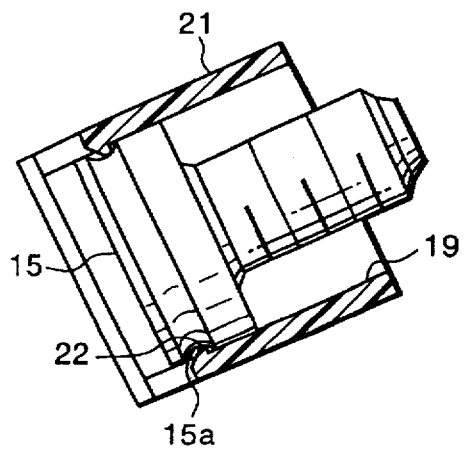
FIG. 9 is an enlarged fragmentary sectional view of a portion of the temporary bolt holder and a bolt provisionally held therein.

With the lower cover 7 secured to the steering wheel main body 2 as shown in FIGS. 8 and 9, a bolt 15 can be inserted into the through hole 19 of each bolt holder 21 from the associated bolt hole 20. As a result, the projections 22 engage with the groove 15a at the top end of the bolt 15 while a part of the shank of the bolt 15 extends through the bolt hole 17 of the spoke portion 5, and the bolt 15 is provisionally held in place for use in the subsequent assembly of the steering wheel.

Figure 1:
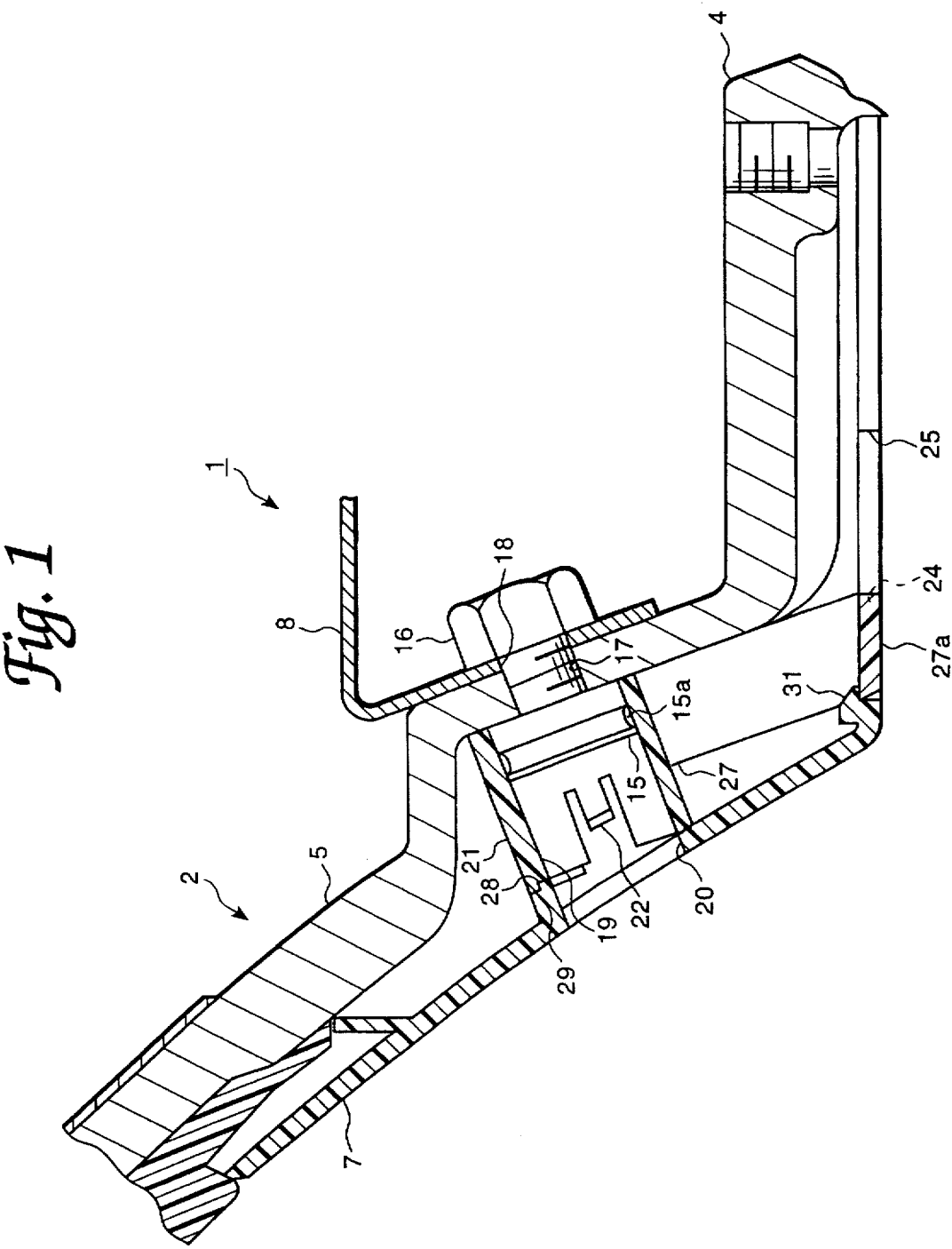
FIG. 1 is an enlarged sectional view showing the attachment of a pad module according to a first embodiment of the present invention.

Thereafter, as shown in FIGS. 1 and 2, the pad module 3, together with the above-described structure, is placed at a predetermined position where bolt holes 18 of the bag holder 8 are registered with the respective bolt holes 17 of the spoke portions 5. Since nuts 16 will have been previously set on the inner side of the bag holder 8, and each bolt 15 and the associated nut 16 can be tightly fastened to each other, for example by using a fastening jig (not shown). As bolts are rotated onto engagement with nuts 16 the engagement between the projections 22 and the groove 15a at the top end of each bolt 15 is released by the fastening jig. As a result, the pad module 3 is securely attached to the steering wheel main body 2 by the fastening of bolts 15 and nuts 16.

As described above, according to the method of attaching the pad module 3 of the illustrated embodiment, because the temporary bolt holders 21 are formed integrally with the lower cover 7, it is unnecessary to additionally prepare separate parts for temporarily holding the bolts, in contrast with the conventional art which requires such additional parts. Also, there is no need to fix any additional parts with screws or the like. Therefore, the present invention reduces the number of parts and the required time for the attachment, which results in cost reduction and improved work efficiency.

In the illustrated first embodiment, bolts 15 extend through the respective bolt holes 17 of the metal spoke portions 5 which constitute parts of the steering wheel main body 2, and then, they are fastened. The pad module 3 can be directly attached to the steering wheel main body 2 without requiring any metal plate to be fixed to the steering wheel main body 2. As a result, it is possible to attain further cost reductions and further improvements in work efficiency.

When forming the lower cover 7, the arm portions 27 extending from the respective hinge portions 24 are formed to extend substantially parallel with the bottom 23 of the lower cover 7, thereby facilitating opening operation of the dies in the molding apparatus. Accordingly, the structure of the dies for forming the lower cover will be relatively uncomplicated. Because the temporary bolt holders 21 are formed integrally with the lower cover 7, as in the illustrated embodiment, it is possible to keep molding costs from increasing.

Extension 28 is provided on the upper periphery of each bolt hole 20 of the lower cover 7. The engageable stepped portion 29 is provided at the top end of the temporary bolt holder 21. With such structures, when each arm portion 27 is rotated, the corresponding stepped portion 29 will be guided to the associated extension 28, so that the through hole 19 of each bolt holder 21 can be easily registered with the corresponding bolt hole 20 by a simple operation.

A second embodiment of the invention is described with reference to FIGS. 10 to 12.

In this second embodiment, a pad module is attached to a steering wheel that has four spoke portions. The pad module and steering wheel may have the same essential structure as that of the first embodiment. Different portions from the first embodiment will be described below.

Figure 10:
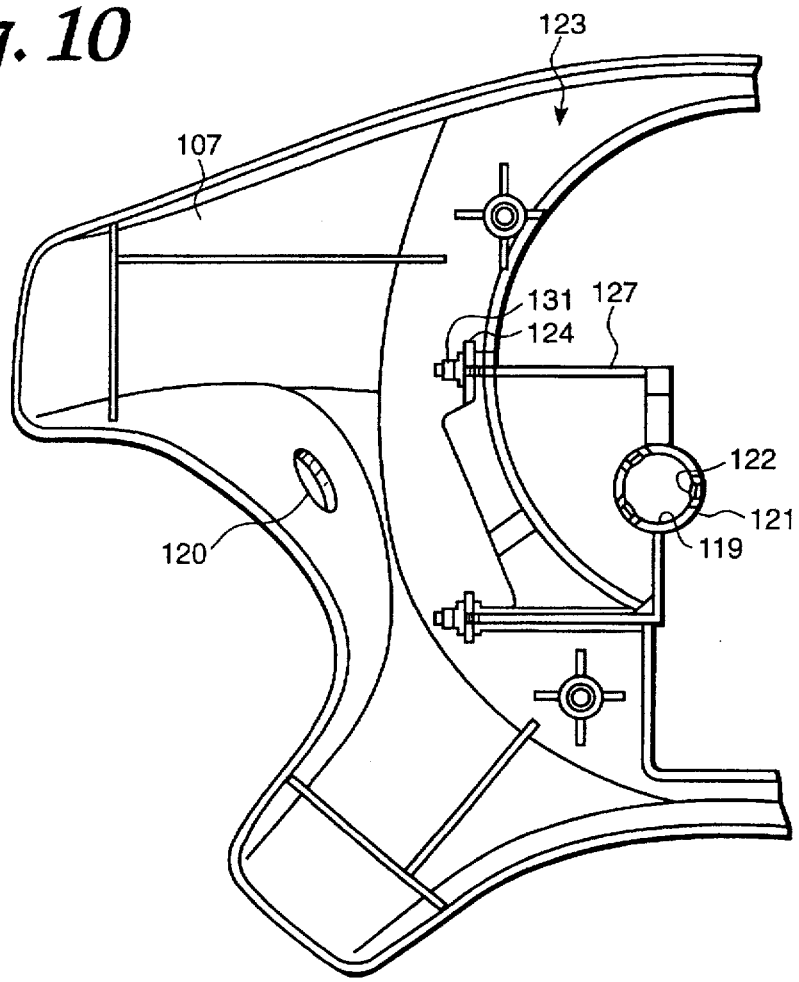
FIG. 10 is a fragmentary plan view of a lower cover according to a second embodiment of the present invention.
Figure 11:
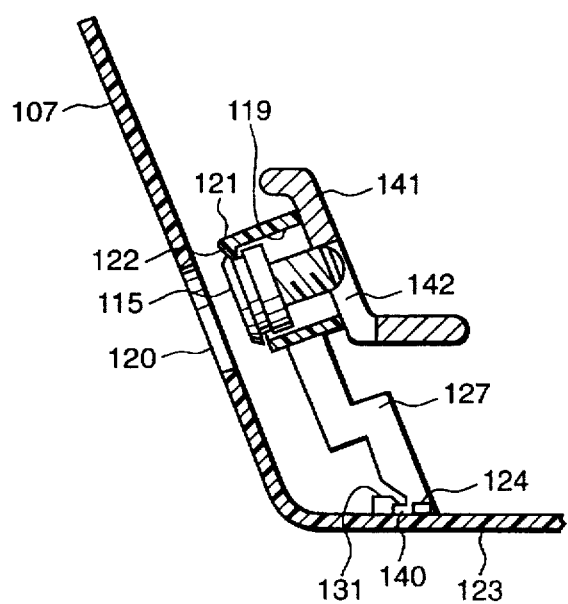
FIG. 11 is a sectional view of a portion of the lower cover of FIG. 10, showing a temporary bolt holder in its rotated position.

A lower cover 107 of the pad module is molded from a resin, such as, for example, from polypropylene, and has two temporary bolt holders 121 formed integrally therewith, only one of which is illustrated in FIG. 10. The two temporary bolt holders 121 are disposed symmetrically with regard to a steering shaft interposed therebetween. The temporary bolt holders 121 each have a cylindrical shape and include a through hole 119. The temporary bolt holders 121 are provided with projections 122 for temporarily engaging and holding bolts 115, as shown in FIG. 11. Each temporary bolt holder 121 is connected to the bottom 123 of the lower cover 107 via a pair of arm portions 127. Arm portions 127 each have a relatively large gap therebetween, and they have a slightly different shape from each other in order to avoid interference with electric or other parts attached to the steering wheel.

Hinge portions 124 are formed at ends of the respective arm portions 127. As best seen from FIG. 11, the arm portions 127 are further provided at their respective ends with an engagement member 140. Engagement claws 131 are also provided on the lower cover 107 at respective positions on bottom 123 adjacent engagement members 140.

The engagement claws 131 and members 140 engage one another when the arm portions 127 are rotated into predetermined positions from the lower cover bottom 123, so as to prevent arm portions 127 from returning to their initial unrotated positions.

Bolt insertion holes 120 are formed in the lower cover 107 so that they are registered with the respective through holes 119 of the temporary bolt holders 121 when the holders are positioned in place for attachment. However, no registration projections are provided either on the bolt insertion holes 120 of the lower cover 107 or on the temporary bolt holders 121 and as shown in FIG. 11 the holders 121 are spaced from the interior surface of lower cover 7 adjacent holes 120.

Figure 12:
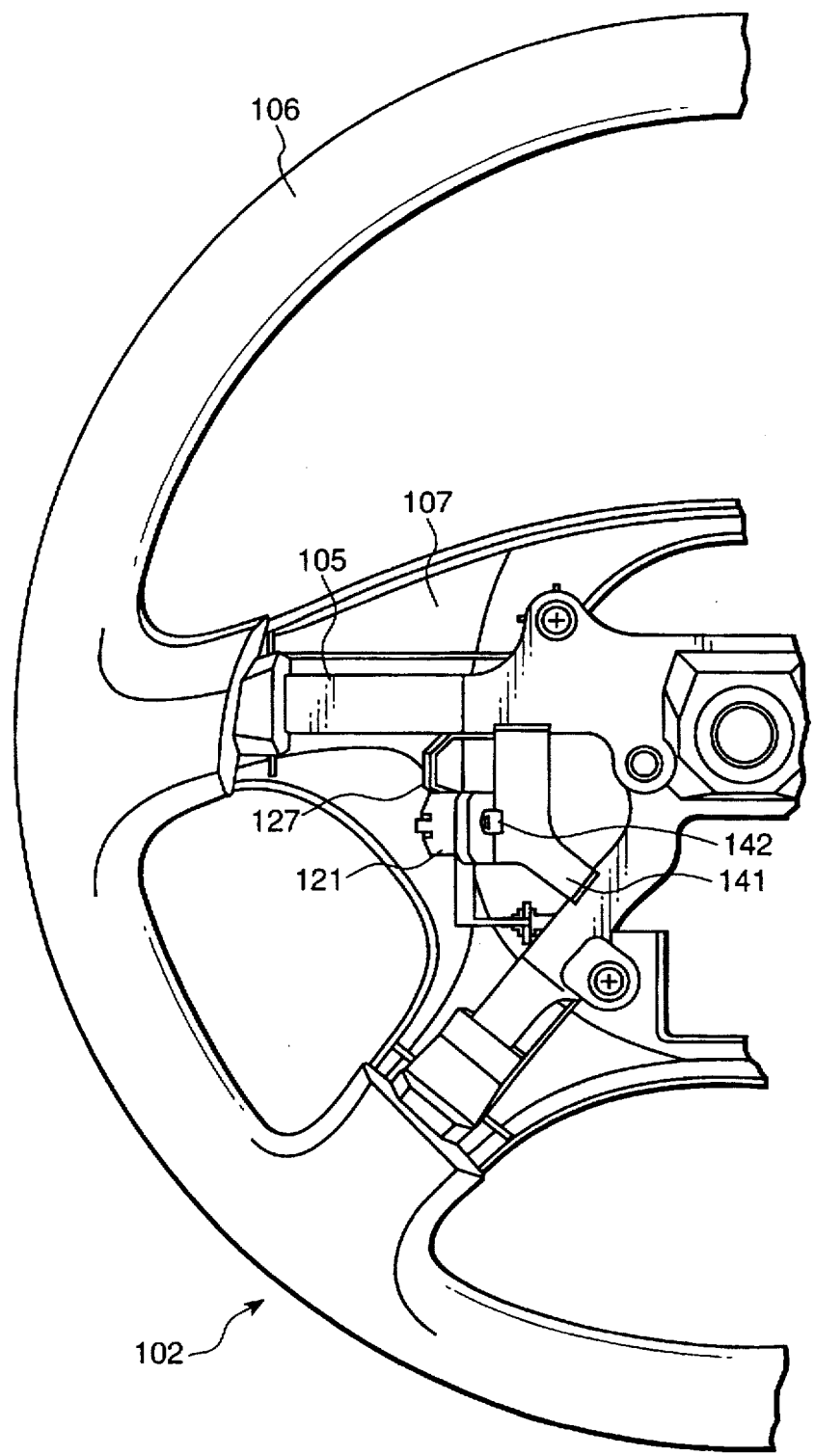
FIG. 12 is a fragmentary plan view, with portions cut away for clarity, showing the bolted correction according to the second embodiment of FIG. 10.
Figure 13:
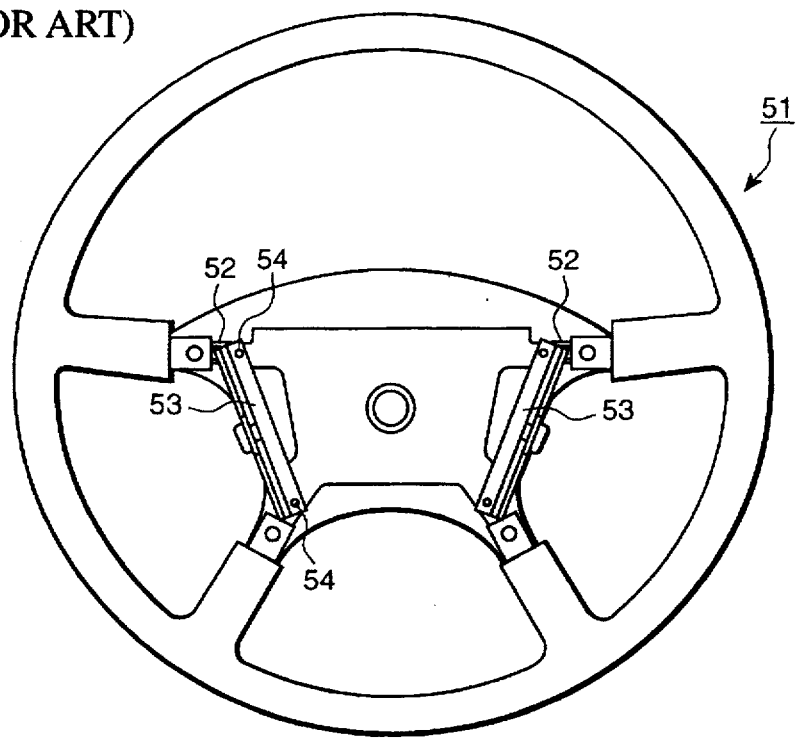
FIG. 13 is a plan view showing a prior art steering wheel main body.
Figure 14:
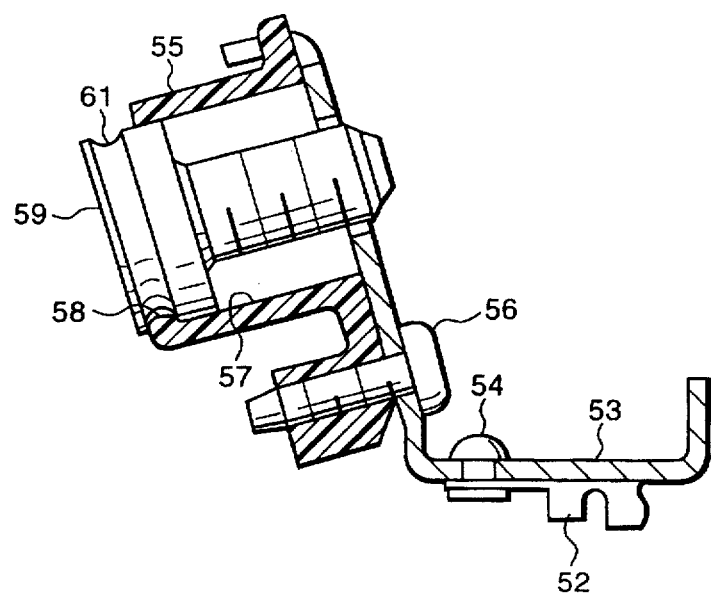
FIG. 14 is an enlarged section view showing a portion of the prior art mounting technique of FIG. 13.
Figure 15:
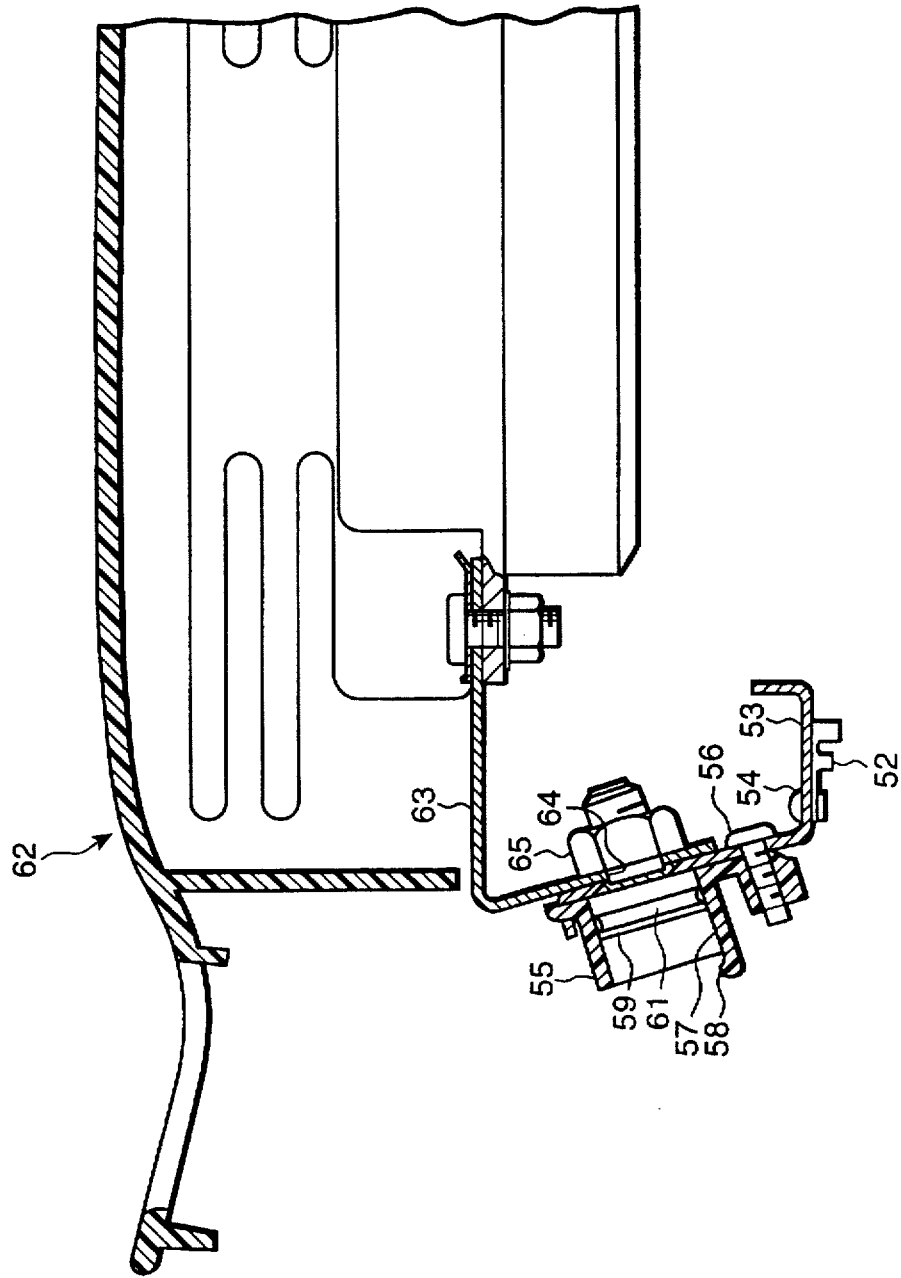
FIG. 15 is a fragmentary section view showing the structure of attachment of the pad module according to the conventional art.

The steering wheel main body 102 has four spoke portions 105, with only two being illustrated in FIG. 12. A connecting member 141 made of metal is attached between two adjacent spoke portions 105. The connecting member 141 may be formed integrally with the spoke portions 105 or may be secured to the spoke portions by appropriate fastening means such as bolts. The connecting member 141 is provided with a hole 142 for allowing the bolt 115 to pass through, which hole is adapted to be registered with the through hole 119 of the temporary bolt holder 121 when the holder is positioned in place for attachment.

Also in this embodiment, after the arm portions 127 are pulled up to the predetermined positions for attachment and the bolts 115 are provisionally held by the respective temporary bolt holders 121, the lower cover 107 is attached to the steering wheel main body 102. At this time, each temporary bolt holder 121 is pressed against the back surface of the corresponding connecting member 141 and is kept in contact with the connecting member 141 due to the elastic resiliency of the hinge portion 124 and the arm portion 127.

The second embodiment has similar advantages to those of the first embodiment. While the second embodiment additionally requires the connecting member 141, it spans between two adjacent spokes so that as compared with the case where bolts 115 would be provided for every spoke portion, the number of parts required is smaller and the related structures are less complicated.

The present invention is not limited to the above embodiments, and it may be embodied as follows.

(1) In the first embodiment, after the lower cover 7 is secured to the steering wheel main body 2, the bolts 15 are fitted in the respective through holes 19 of the temporary bolt holders 121 and provisionally held. Alternatively, the lower cover 107 may be secured to the steering wheel main body 2 after the bolts 115 are temporarily held.

(2) Both the embodiments concern attachment of the pad module having an air bag mechanism. However, the present invention can be applied also to attachment of a pad module of a type having a so-called energy absorption mechanism which does not include such air bag mechanism.

(3) Although the extension 28 and the stepped portion 29 each having shoulders are formed to provide a positioning mechanism in the first embodiment, only one of the bolt hole 20 and the temporary bolt holder 21 may be provided with such positioning mechanism.

(4) Although the engagement claws 31 are formed integrally with the bottom 23 of the lower cover 7 in the first embodiment, such an engaging mechanism may be provided on the arm portions 27 to engage part of the bottom 23.

(5) In either embodiment, polypropylene is adopted as a material for forming the lower cover 7 or 107. However, it is possible to use any resin material which has such elasticity that the hinge portions 24 or 124 are not separated from the bottom 123 of the lower cover even when the hinge portions are subject to torsional forces during rotation.

(6) Although the number of the spoke portions is three and four in the above-described embodiments, it may be two or more than four.

(7) In the embodiments described above, the bolts are provisionally held by the engagement between the projections 22 or 122 and the respective grooves 15a or 115a at the top ends of the bolts. However, without such temporary detent means, the bolts may be temporarily held due to only frictional force between the bolt holders and the head portions of the bolts.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of attaching a steering wheel main body, including a lower cover and an annular ring and spoke portions to a pad module wherein the pad module includes a support plate and a pad body, the method comprising steps of:

forming a lower cover and integrally molding therewith a temporary bolt holder with an interconnecting hinge therebetween and a bolt hole spaced from the hinge;

rotating the temporary bolt holder around the hinge and fixedly holding the temporary bolt holder at a position whereby a bolt can be inserted through the bolt hole and into the temporary bolt holder;

setting a bolt through the bolt hole and into the temporary bolt holder, fitting the lower cover to the pad module; and attaching the lower cover to the pad module by fastening the bolt to the support plate.

2. A method according to claim 1, wherein the step setting includes placing the bolt through a spoke portion and then fastening the bolt to the support plate.

3. A method according to claim 1, wherein the step of rotating includes interengaging a positioning mechanism provided on each of the periphery of the bolt hole and a corresponding portion of the temporary bolt holder so as to facilitate the registration of the temporary bolt holder adjacent the bolt hole.

4. A method according to claim 1, wherein a positioning mechanism is provided on at least one of the periphery of the bolt hole and the temporary bolt holder so as to facilitate the registration of the temporary bolt holder adjacent the bole hole.

5. A method according to claim 1, wherein the steering wheel main body includes a plurality of spoke portions and the additional step of attaching a connecting member provided between adjacent spoke portions and subsequently positioning the bolt through the connecting member prior to fastening the bolt to the support holder.

6. A method according to claim 5, including the additional step of pressing the temporary bolt holder against the connecting member when the lower covet is fitted to the pad module so that the temporary bolt holder is held at a registered position with the bolt hole due to elastic resiliency of the hinge.

7. A molded steering wheel lower cover comprising:

a main body member having a bolt hole extending therethrough;

a temporary bolt holder comprising a hinge and a bolt receiving portion, said hinge interconnecting said bolt receiving portion to said main body member, said temporary bolt holder being rotatable about said hinge between a non-rotated position in which said bolt receiving portion is not aligned with said bolt hole and a rotated position in which said bolt receiving portion and said bolt hole are aligned to permit insertion of a bolt through said bolt hole and into said temporary bolt holder;

at least one catching member provided on at least one of said main body member and said temporary bolt holder so that when said temporary bolt holder is rotated, said temporary will be held in the rotated position.

8. The molded steering wheel lower cover according to claim 7, wherein the temporary bolt holder further includes an arm portion positioned between said bolt receiving portion and said hinge.

9. The molded steering wheel lower cover according to claim 7, wherein at least a portion of the periphery of said bolt hole and at least a corresponding portion of said bolt receiving portion includes a positioning mechanism to facilitate registration between said bolt receiving portion and said hole.

10. The molded steering wheel lower cover according to claim 7, wherein at least one of a portion of the periphery of the bolt hole and a portion of said bolt receiving portion includes a positioning mechanism to facilitate registration therebetween.

* * * * *